United States Patent
Song et al.

(10) Patent No.: US 8,239,843 B2
(45) Date of Patent: Aug. 7, 2012

(54) VALUE PREDICTABLE VARIABLE SCOPING FOR SPECULATIVE AUTOMATIC PARALLELIZATION WITH TRANSACTIONAL MEMORY

(75) Inventors: Yonghong Song, Palo Alto, CA (US); Xiangyun Kong, Union City, CA (US); Spiros Kalogeropulos, Los Gatos, CA (US); Partha P. Tirumalai, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1184 days.

(21) Appl. No.: 12/046,365

(22) Filed: Mar. 11, 2008

(65) Prior Publication Data

US 2009/0235237 A1 Sep. 17, 2009

(51) Int. Cl.
*G06F 9/45* (2006.01)
(52) U.S. Cl. ......... 717/149; 717/140; 717/151; 717/160
(58) Field of Classification Search .................. None
See application file for complete search history.

(56) References Cited

U.S. PATENT DOCUMENTS

| | | | |
|---|---|---|---|
| 5,978,588 A * | 11/1999 | Wallace .................... | 717/159 |
| 6,530,079 B1 * | 3/2003 | Midkiff et al. ............. | 717/158 |
| 6,542,988 B1 * | 4/2003 | Tremblay et al. .......... | 712/225 |
| 6,704,862 B1 * | 3/2004 | Chaudhry et al. .......... | 712/244 |
| 7,404,183 B2 * | 7/2008 | Grcevski et al. ........... | 717/160 |
| 7,844,946 B2 * | 11/2010 | Wu et al. ................... | 717/149 |
| 7,865,885 B2 * | 1/2011 | Wu et al. ................... | 717/151 |
| 8,099,726 B2 * | 1/2012 | Harris ....................... | 717/151 |
| 8,146,064 B2 * | 3/2012 | Chen et al. ................ | 717/140 |
| 8,151,252 B2 * | 4/2012 | Song et al. ................ | 717/140 |
| 2004/0154012 A1 * | 8/2004 | Wang et al. ............... | 717/158 |
| 2006/0005176 A1 * | 1/2006 | Kawahara et al. .......... | 717/149 |
| 2006/0294326 A1 * | 12/2006 | Jacobson et al. .......... | 711/156 |
| 2007/0022412 A1 * | 1/2007 | Tirumalai et al. .......... | 717/140 |
| 2007/0239943 A1 * | 10/2007 | Dice et al. ................. | 711/147 |
| 2008/0120299 A1 * | 5/2008 | Duffy et al. ............... | 707/8 |
| 2008/0126764 A1 * | 5/2008 | Wu et al. ................... | 712/226 |
| 2008/0250401 A1 * | 10/2008 | Puri et al. ................. | 717/160 |
| 2009/0307673 A1 * | 12/2009 | Eichenberger et al. ..... | 717/160 |
| 2010/0199257 A1 * | 8/2010 | Biggerstaff ................ | 717/149 |
| 2010/0275190 A1 * | 10/2010 | Ishizaki .................... | 717/149 |

(Continued)

OTHER PUBLICATIONS

Song et al., "Applying Array Contraction to a Sequence of DOALL Loops", 2004 IEEE, pp. 1-8.*

(Continued)

*Primary Examiner* — Thuy Dao
*Assistant Examiner* — Ben Wang
(74) *Attorney, Agent, or Firm* — Osha Liang LLP

(57) ABSTRACT

Parallelize a computer program by scoping program variables at compile time and inserting code into the program. Identify as value predictable variables, variables that are: defined only once in a loop of the program; not defined in any inner loop of the loop; and used in the loop. Optionally also: identify a code block in the program that contains a variable assignment, and then traverse a path backwards from the block through a control flow graph of the program. Name in a set all blocks along the path until a loop header block. For each block in the set, determine program blocks that logically succeed the block and are not in the first set. Identify all paths between the block and the determined blocks as failure paths, and insert code into the failure paths. When executed at run time of the program, the inserted code fails the corresponding path.

22 Claims, 6 Drawing Sheets

U.S. PATENT DOCUMENTS

2011/0093837 A1* 4/2011 Guenthner et al. ............ 717/149

OTHER PUBLICATIONS

Song et al., "Design and Implementation of a Compiler Framework for Helper Threading on Multi-Core Processors", 2005 IEEE, pp. 1-11.*

Kalogeropulos et al., "Processor Aware Anticipatory Prefetching in Loops", HPCA-2004, Madrid, Spain, pp. 1-20.*

Li et al., "Software Value Prediction for Speculative Parallel Threaded Computations", Jun. 7, 2003;First Value-Prediction Workshop, Intel Corporation, pp. 18-25.*

Chi Cao Minh, "Designing an Effective Hybrid Transactional Memory System", Sep. 2008, Stanford University, pp. 1-132. <http://tcc.stanford.edu/publications/tcc_thesis_caominh.pdf>.*

Adl-Tabatabai et al., "Compiler and Runtime Support for Efficient Software Transactional Memory", 2006 ACM, pp. 26-37. <http://dl.acm.org/results.cfm?h=1&cfid=75857085&cftoken=60587811>.*

Ceze et al., "Bulk Disambiguation of Speculative Threads in Multi-processors", 2006 IEEE, pp. 1-12. <http://ieeexplore.ieee.org/stamp/stamp.jsp?tp=&arnumber=1635955>.*

* cited by examiner

VALUE PREDICTABLE VARIABLE SCOPING FOR SPECULATIVE AUTOMATIC PARALLELIZATION WITH TRANSACTIONAL MEMORY

RELATED APPLICATIONS

Copending application Ser. No. 12/035,828, filed on Feb. 22, 2008, which is published on Apr. 3, 2012 as U.S. Pat. No. 8,151,252, is hereby incorporated by reference.

FIELD OF THE INVENTION

Embodiments of the invention are directed to compiler techniques that support speculative execution of program instructions.

BACKGROUND

As multi-core chips become more popular, their support for multi-threaded applications becomes more important, Hardware transactional memory is one such example. Various research projects have demonstrated that transactional memory can greatly reduce lock contention and hence improve multi-threaded application performance. However, little research has been done on using transactional memory to help parallelize programs.

BRIEF SUMMARY

In an example embodiment, a method for parallelizing execution of a computer program includes for each loop in the program, determining all variables that are defined only once in the loop, are not defined in any inner loop of the loop, and are used in the loop, and identifying the determined variables as value predictable variables. In an example embodiment, the method includes identifying a first code block of the computer program that contains an assignment of a variable, and then traversing a path backwards through a control flow graph of the computer program, starting with the identified code block. All blocks along the path are identified until the path reaches a loop header block, and the identified blocks are indicated or named in a first set. For each block in the first set, blocks in the program that logically succeed the block and are not in the first set, are determined, and all paths between the block and the determined blocks are identified as failure paths. Code is inserted into the failure paths (e.g. by the compiler). The inserted code can include instructions for causing a computer to identify the corresponding path as failed at run time of the program. The program including the inserted code can be stored. In an example embodiment, a parallelization library is enhanced to include instructions such that if one thread has a value prediction wrong at runtime, all subsequent speculative threads will be quashed.

In example embodiments, the backwards traverse of the path can include recursively visiting each code block that logically precedes the first code block. In an example embodiment, for each of the determined blocks that has a block in the first set as a sole predecessor, the determined block is indicated or named in a second set. In an example embodiment, for each of the determined blocks that has at least two blocks in the first set as predecessors, for each of these predecessors a new block is created and inserted between the predecessor and the determined block and the new block is indicated or named in the second set. Then, code is inserted into failure paths indicated by the second set. The code can include, for example, instructions for causing a computer to identify the corresponding path as failed at run time of the program.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Insertion of code into a program can include adding code or instructions into the program. The program can also be enhanced or altered by providing links or other mechanism(s) within (or in connection with) the program, that enable the program to access and/or execute additional code.

Figure 1:
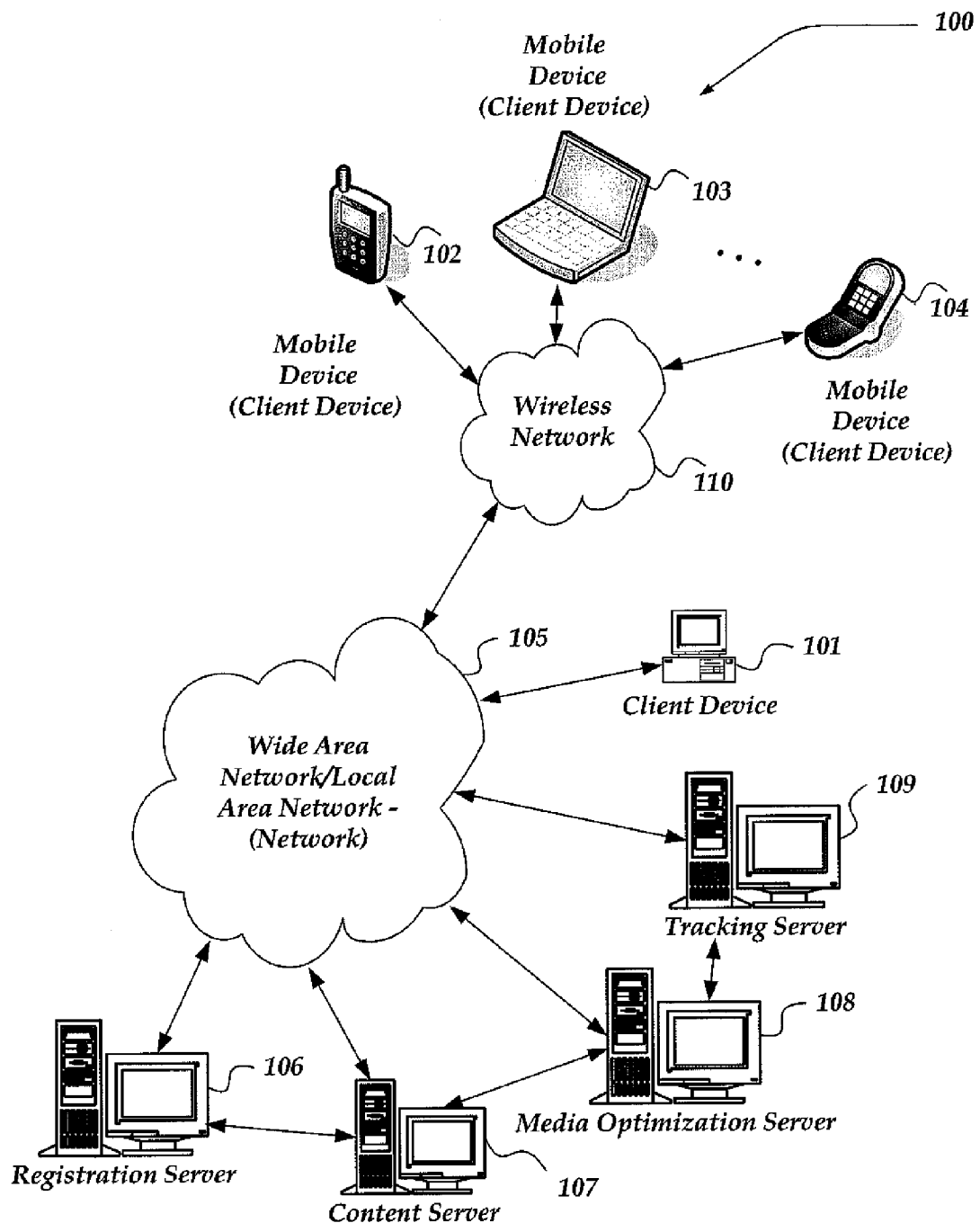
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and network devices or servers. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, and servers 106, 107, 108, 109.

Example embodiments described herein can be implemented using one or more of the elements shown in FIG. 1. For example, code libraries, compiler and analysis software, data or code storage and so forth can be variously located at and/or accessed via one or more of the computer devices shown in FIG. 1, for example the servers 106-109 which can optionally also perform unrelated functions, one or more of the computer devices 101-104, and so forth. The compilation, analysis and code modification or enhancement techniques described herein can be performed by one or more of the computer devices shown in FIG. 1, with single or joint effect, and results of the process or results of portions of the process or sub-processes can be variously communicated within the system 100, stored onto computer readable media, and so forth.

The mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. The client computer device 101 may include virtually any computing device capable of performing computational functions and communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like.

Figure 2:
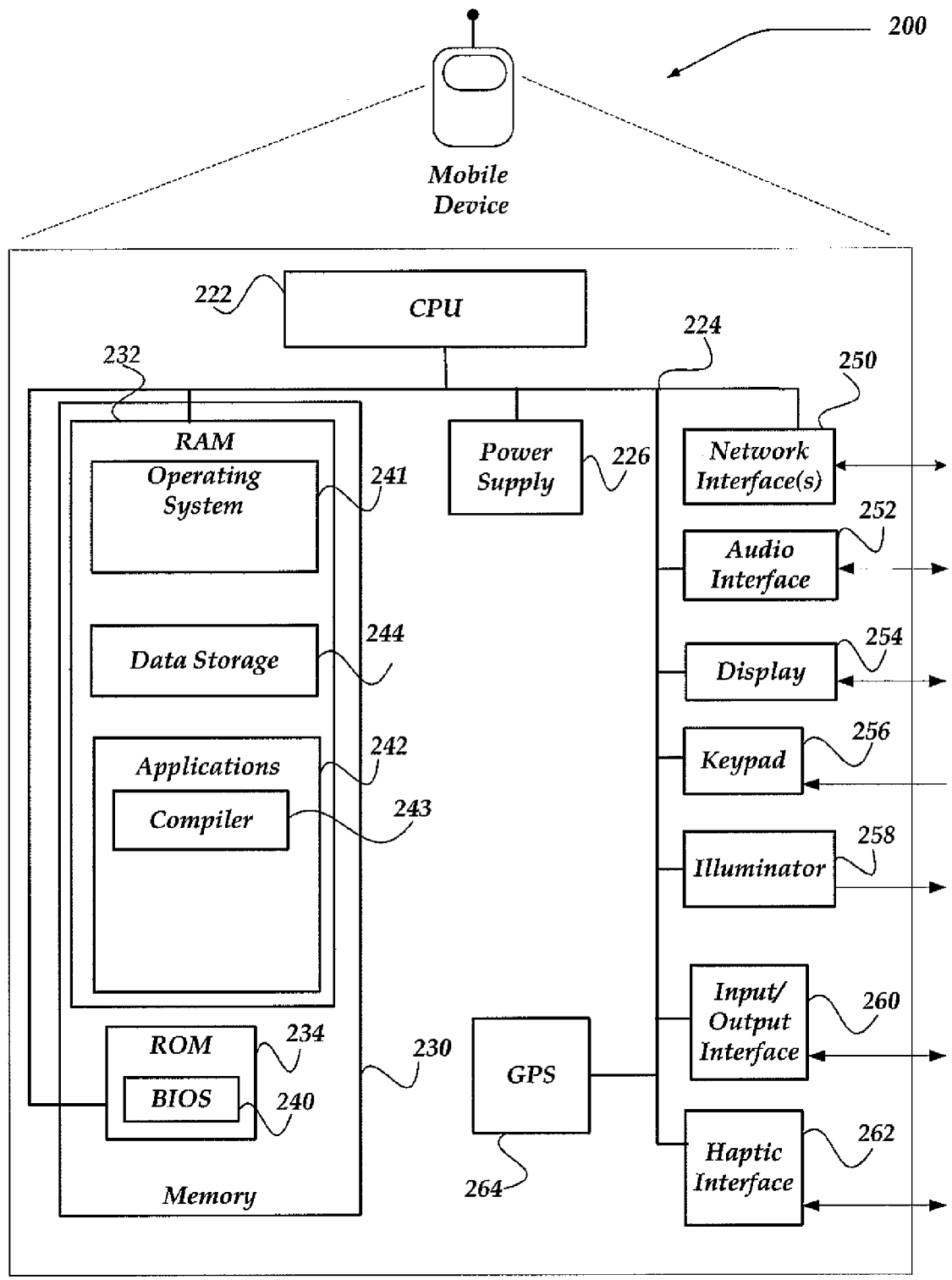
FIG. 2 shows one embodiment of a mobile device that may be included in a system implementing the invention.

FIG. 2 shows an embodiment of mobile device 200 that may be included in a system implementing one or more embodiments of the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in FIG. 2, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery. Mobile device 200 may optionally communicate with a base station (not shown), or directly with another computing device.

Keypad 256 may comprise any input device arranged to receive input from a user. Illuminator 258 may provide a status indication and/or provide light. The input/output interface 260 can be used for communicating with external devices, such as a headset, or other input or output devices not shown in FIG. 2. Haptic interface 262 is arranged to provide tactile feedback to a user of the client device.

Mass memory 230 includes one or more data storage 244, which can be utilized by mobile device 200 to store, among other things, applications 242 and/or other data. Applications 242 includes but is not limited to a compiler 243 arranged to perform the various functions of the example embodiments described herein. The memory 230 also includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory may also store an operating system 241 for controlling other operations of mobile device 200. It will be appreciated that this component may include a specialized client communication operating system such as Windows Mobile™, or the Symbian® operating system, or a general purpose operating system such as a version of UNIX, or LINUX™.

Figure 3:
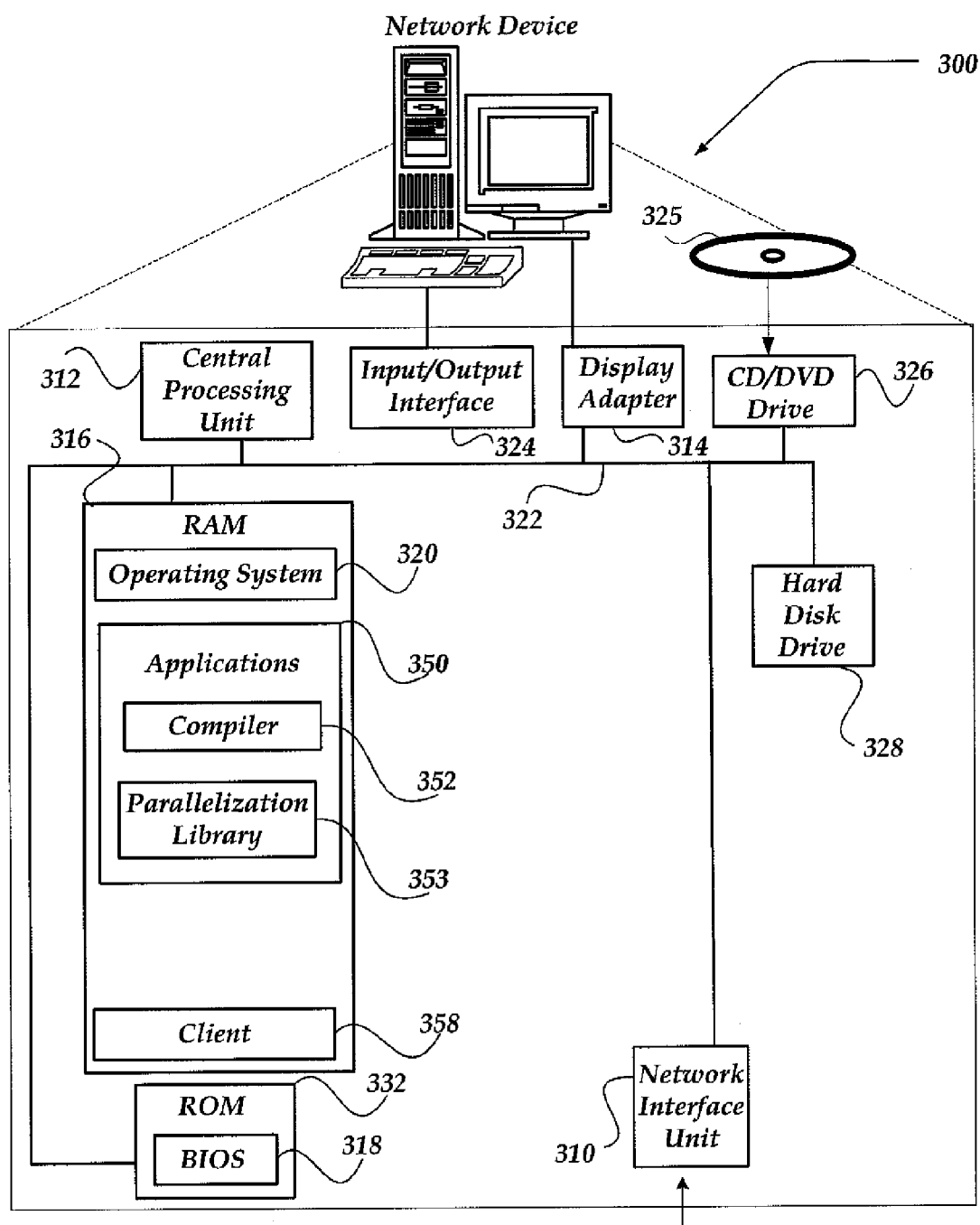
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, the server 106 and/or server 107 of FIG. 1.

Network device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, CD/DVD drive 326 with optionally removable storage medium 325, and/or floppy disk drive. The mass memory stores operating system 320 for controlling the operation of network device 300. Any general-purpose operating system may be employed. Basic input/output system ("BIOS") 318 can be provided for controlling the low-level operation of network device 300. The network device 300 can communicate with the Internet, or some other communications network, via network interface unit 310.

The mass memory as described above illustrates another type of processor-readable media, storage media. Storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320, including a compiler 352 and parallelization library 353 arranged or configured to perform or enable the various functions described herein. The mass memory can also include a client module 358, for example so that the network device can perform as, or perform the functions of, the client device 101 shown in FIG. 1.

Returning now to a discussion of parallel processing regimes, note that instructions can be performed speculatively, for example out of program order and/or before things upon which they may depend are known or determined. Prediction mechanisms can be employed to maximize or increase successful speculation, but recovery mechanisms are also needed to gracefully or effectively recover from situations where the speculation turned out to be incorrect. This can be useful for example with respect to transactional memory support, so that speculative load and store operations don't clash. Thus a compiler can speculatively schedule code for execution, but also provide remedial or recovery code so that if at run time there is a conflict, the remedial code can be executed to retrace or return to a point where program code can be executed differently to obtain a proper or correct result. The compiler can link in a runtime library to the runtime code, thus enabling library code to be executed at runtime of the program. The runtime library can be, or can include, a parallelization library.

Transaction regions, as will be described in greater detail further below, can be used together with checkpoints so that speculative computational results from a transaction region are buffered but not released to main memory (not "committed") until it is clear they are correct. A checkpoint can be located or inserted at the beginning of such speculatively executed code to trigger oversight and/or allow the computer (via software and/or hardware) to identify dependencies at run time, and a checkpoint or commit instruction can be inserted at a later junction to determine whether the speculatively generated results are correct and can be committed.

In example embodiments disclosed herein, a compiler framework is described to automatically parallelize code or program loops which cannot be easily or effectively parallelized by existing techniques, and to generate code that implements or supports this function.

Example techniques described herein can be supported or enhanced via hardware transaction support including checkpoint/commit instruction pair(s), a special load ASI with which the load does not participate in, and hardware transaction disambiguation.

As described in further detail below, example embodiments include one or more of: a scheme or technique to insert checkpoint and commit instructions in a parallelization library for the purpose of speculative automatic parallelization; a mechanism or technique in the parallelization library for transaction failure control; mechanism in the compiler to scope certain scalar variables; and mechanism in the parallelization library to conduct reduction and copy-out operations for the purpose of speculative automatic parallelization.

In an example embodiment, a framework contains two parts: a compiler/parallelizer implementation to speculatively parallelize loops; and a parallelization library.

In this framework, only countable loops are processed, whose total iteration count can be determined before the loop is executed at runtime. The compiler processes loops from outer to inner along with the loop hierarchy graph. If one countable loop is a DOALL loop, it will be parallelized without speculation and all its children loops will not be processed further. (A loop is a DOALL loop if it does not have any inter-iteration dependences.) If one countable non-DOALL loop is found and it does not contain any other countable loops, then this loop will be parallelized with speculation.

In an example embodiment, a front end (e.g. a C, C++, FORTRAN, or other front end) translates source code(s) into an internal intermediate representation, which is the "code" processed by the parallelizer. For the loop to be parallelized, either speculatively or non-speculatively, the compiler will put the loop body along with runtime-to-be-determined loop "lower" bound, "upper" bound, and other information into a separate routine, which will be called "mfunction" herein. The "lower" and "upper" bound will partition the original work into several chunks which are to be executed by several threads. At runtime, the application will spawn several threads and each thread will execute this "mfunction" with properly computed lower and upper bound.

The compiler will do the work for variable scoping and outlining. The parallelization library will do the thread management and actual reduction and copy-out. For example, routines or code in the parallelization library can be executed at run time of the program to perform or enable thread management and/or actual reduction and copy-out. In an example embodiment, the compiler and parallelization library are jointly responsible for transaction failure control.

Figure 4:
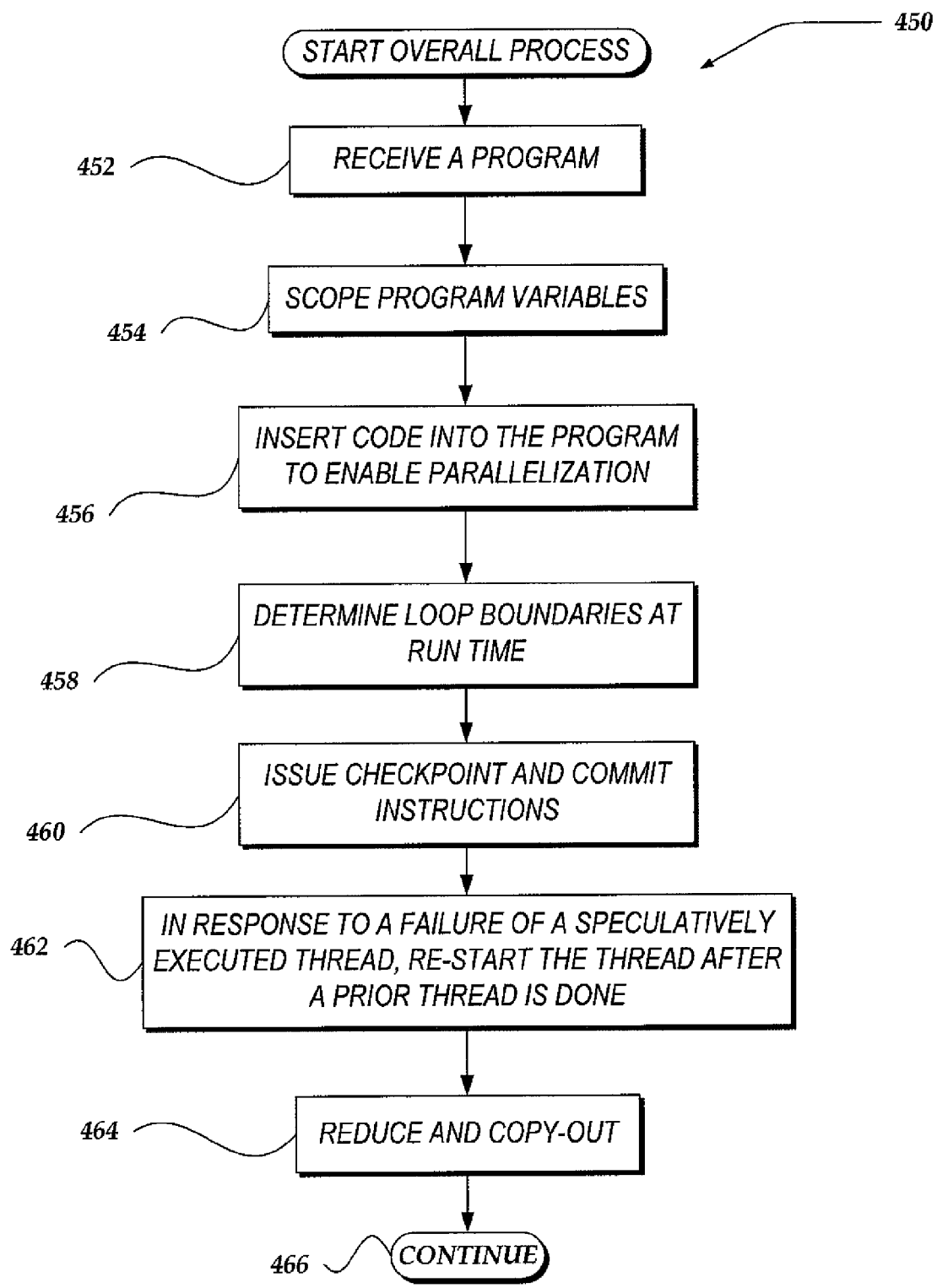
FIG. 4 illustrates an example process in accordance with example embodiments.

FIG. 4 illustrates an example process 450 wherein in a first block 452, a program is received to be parallelized. In a next block 454, variables of the program are scoped, for example scalar variables. In a next block 456, code is inserted, for example by the compiler, into the program to enable parallelization. In a next block 458, loop boundaries of the program are determined at runtime of the program, for example via routines provided by or accessed from the parallelization library. In a next block 460, checkpoint and commit instructions are issued while the program is running or executing, e.g. for parallelized loops in the program. In a next block 462, if a speculatively executed thread fails, it is restarted after a thread prior to it is done. In a next block 464, reduction and copy out are performed, for example by a main thread of the program. Details of these blocks will be described further below.

With respect to an example compiler framework for use with example embodiments, such a compiler framework can include two parts or functions. First, the compiler can perform "scoping" for each variable in the loop body. A purpose of "scoping" is to make sure variables are accessed correctly in semantics and to minimize shared variables to avoid frequent transaction failure. Second, the compiler can generate "mfunction" codes, which will be explained further below.

Several rules will apply to the process of scoping. Scoping is a process to determine how a variable is used in the outline body of the program code. There can be several common cases, as outlined below.

In a first case, "shared", if a variable is scoped as shared, then its use will become a load or store in the mfunction. A "shared" variable such as a scalar variable (i.e., a variable that can hold only one value at a time) can be used for load and/or store operations.

In another case, "copy-in", if a variable is scoped as copy-in, its value will be copied into a private variable inside mfunction as the initial value. Then, that private variable will be used in mfunction. "Private" generally means that the variable in question is a locally-defined variable, for example for use within a local loop or context. A "copy-in" variable can be copied-in with a load operation.

In another case, "copy-out", if a variable is scoped as copy-out, then its value at the last original loop iteration will be copied out and will be visible after the parallelized loop. A "copy-out" variable can be copied out with a store operation.

In another case, "reduction", a partial result will be computed inside mfunction. Partial results will be merged together across all threads.

Some currently available and known compilers have automatic parallelization (e.g. "autopar") scoping. In exemplary embodiment, such autopar scoping is re-used to ensure all memory access dependencies are preserved inside the "mfunction". For scalar dependencies, an example embodiment of the present invention follows these scoping rules: if a scalar is only involved in intra-loop dependence, this scalar will be scoped as "private"; otherwise, if a scalar is involved in reduction, it will be recognized as a reduction; otherwise, the scalar is involved in an inter-loop non-reduction dependence, and it will be scoped as shared.

Independently from scalar dependencies inside the loop, example embodiments also examine whether a scalar is defined inside the loop and used outside the loop, or not. For example, suppose the scalar is used outside the loop. If the scalar is guaranteed to be defined in the last iteration of the loop, then in example embodiments this variable is scoped as copy-out, otherwise, the variable is scoped as shared. If one variable is scoped as private based on inside loop dependence criteria, and is scoped as shared based on whether it is used outside the loop, it will be scoped as shared.

The scoping algorithm(s) described above can thus be used to scope scalar variables in example embodiments.

Some countable loops are not profitable for speculative parallelization. For example, a shared variable can be modified on every iteration, and therefore might not be a good candidate for speculative parallelization since transactions can (or will) fail for such cases. In such cases, example embodiments optionally do not perform speculative parallelization.

Now consider an example for applying these scoping rules/principles, Example 1:

```
s = 0.0; j = 1;
for (k = 0; k < n; k++) {
    p = foo (k);
    if (a[k]) continue;
    s = s + b[j];
    j = j + 1;
}
print (j, p, s);
```

In this Example 1, loop index "k" will be scoped as a private (locally defined) variable; variable "S" will be a reduction variable with reduction operator "+"; variable "j" will be scoped as shared; variable "p" will be a copy-out variable; and variables "a" and "b" will be copy-in variables.

The scoping rules and principles described above can be variously applied, for example, in block 454 of FIG. 4.

Continuing now with Example 1 with respect to code generation, the pseudocode for the generated "mfunction" code will look like:

```
mfunction (argv, thread_id, lower, upper, last_original_index_value) {
    <get addr_of_original_j, addr_of_original_p from argv>
    <get copy_in_a, copy_in_b from argv>
    // Initialize local reduction variable.
    reduction_s = 0.0;
    for (k = lower; k <= upper; k++) {
        private_p = foo (k);
        if (copy_in_a[k]) {
            continue;
```

```
        }
        reduction_s = reduction_s + copy_in_b[shared_j];
        shared_j = shared_j + 1;
    }
    _mt_spec_reduction_ (addr_of_original_s, reduction_s,
        reduction_opcode, thread_id);
    if (k == last_original_index_value) {
        _mt_spec_copy_out_ (private_p, addr_of_original_p,
            thread_id);
    }
}
```

Note that in this example, the "mfunction" has a fixed signature as the above. The argument "argv" is a pointer array which contains a list of addresses to the shared, copy-in, copy-out and reduction variables. The argument "lower" and "upper" are computed by the parallelization library (or by code or routines from the library) to define the work which should be done by each thread. The "last_original_k_value" is passed by the parallelization library which is the last value of loop index "k" for the original loop. This is used for copy out in order to help determine when the copy out should happen.

Also note that the "thread_id" is used for reduction and copy out purpose. The main thread, which is non-speculative, has the thread id of 0. The non-main threads, which may or may not be speculative depending on whether the loop is parallelized speculatively, have the thread id from 1 to the number of non-main threads. For reduction, "thread_id" permits each thread to store its partial result free of data race. If the current thread is the "main" thread based on "thread_id", the reduction can be done directly. For copy out, "thread_id" permits directly to copy out to the shared space if the current thread is the "main" thread.

With respect to the function "_mt_spec_reduction_" cited in the "mfunction" pseudocode, this function "_mt_spec_reduction_" is part of a parallelization library, and records reduction operations. The function "_mt_spec_copy_out_" is also part of the parallelization library and records copy-out operations. These two functions can perform actual reduction and copy out if the calling thread is the "main" thread. Otherwise, because a transaction may fail, the actual reduction and copy out will be done by the "main" thread after all threads are successfully committed.

With respect to parallelization library support, one or more parallelization libraries can be implemented to support speculative parallelization. In an example embodiment, the parallelization library implements one function which will be executed before the "main" function. The environment variable "SPEC_PARALLEL" (which can be named differently, and can have a format: setenv SPEC_PARALLEL <num_of_total_threads>) will be read and appropriate threads will be created. For example, "setenv SPEC_PARALLEL 3" will create two additional threads, and these additional threads will spin, waiting in the beginning, until instructed by the "main" thread to do some real work.

Note that the "mfunction" code can be generated and inserted into (or otherwise associated with the target program being parallelized) in to the program code by the compiler, for example in block 456 of FIG. 4.

With respect to threading support, several global variables can be defined for synchronization between the "main" thread and all other speculative threads, including the following.

int_spec_thread_done_[MAX_NUM_THREADS]

When each thread has finished its work successfully, a bit can be set here int_spec_thread_start_[MAX_NUM_THREADS] .

This variable can be used by the "main" thread to notify speculative threads to start doing real work.

_thread int _spec_master_func_entered_

This variable is defined as a thread local storage, e.g., each thread has a different copy. It will be used to control nested parallelism.

More details will be discussed below for how to use these global variables.

Example functions "_spec_MasterFunction_(argv, . . . )" and "_spec_slave_thread(thread_id)" will now be described. For a loop to be parallelized or speculatively parallelized, in an example embodiment the compiler outlines the loop into "mfunction" form and replaces the original loop with a function call to _spec_MasterFunction_, which is defined inside the parallelization library, The compiler can do this, for example, in block 456 of FIG. 4. In the runtime library initialization phase, before the "main" function takes place, a set of speculative threads are created, and the function_spec_slave_thread_is executed or performed with argument "thread_id". (This can take place, for example, in block 458 and/or block 460 in FIG. 4).

The following shows an example pseudo code structure for_spec_MasterFunction_.

```
_spec_MasterFunction_(argv, <other information>)
<BEGIN>
  if (_spec_master_func_entered_ > 0) {
    num_threads = 1; /* if nested parallel loop, then serialize
    loop's inner regions*/
  }
  else {
    num_threads = _spec_num_threads_;
  }
  _spec_master_func_entered_ ++;
  if (num_threads > 1) {
    <store "argv", "mfunction", and some information to compute
    lower/upper/last_value to some shared space>
    /* Notify speculative slave threads to start the work */
    for (int i = 1; i < num_threads; i++) _spec_thread_start_[i] = 1;
  }
  <compute lower, upper, last_value>
  if (num_threads > 1) {
    "mfunction" (argv, 0, lower, upper, last_value);
       /* Main thread finished its work */
    _spec_thread_done_[0] = 1;
    /* Wait for speculative threads to be done */
    while (_spec_thread_done_[num_threads - 1] == 0);
    /* Reset _spec_thread_done_ */
    _spec_thread_done_[num_threads - 1] = 0;
    /* Okay, done the work, do reduction and copy out here if needed. */
    _main_thread_final_reduc_ ( );
  }
  else {
    /* For nested parallelism or only one thread,
    */
    "mfunction" (argv, 0, lower, upper, last_value);
  }
  _spec_master_func_entered_ --;
<END>
```

The following shows an example pseudo code structure for_spec_slave_thread_.

```
_spec_slave_thread_(int thread_id)
<BEGIN>
  StartPC:
    /* Wait for the signal to start */
    while (!_spec_thread_start_[thread_id]);
    /* Set this before checkpointing */
    _spec_thread_start_[thread_id] = 0;
    <compute lower, upper, last_value>
    if (<loop is parallelized speculatively>) {
      _checkpoint_ (FailPC);
    }
    "mfunction" (argv, thread_id, lower, upper, last_value);
    /* wait for previous thread done and then commit */
    /* The load here should not cause transaction fail, i.e., it should be a*/
    /* non-transactional load.*/
    while (_spec_thread_done_[thread_id - 1] == 0);
    if (<loop is parallelized speculatively>) {
      _commit_ ( );
    }
    _spec_thread_done_[thread_id - 1] = 0;
    _spec_thread_done_[thread_id] = 1;
    goto SuccessPC:
  FailPC:
    /* wait for previous thread done */
    while (_spec_thread_done_[thread_id - 1] == 0);
    "mfunction" (argv, thread_id, lower, upper, last_value);
    _spec_thread_done_[thread_id - 1] = 0;
    _spec_thread_done_[thread_id] = 1;
  SuccessPC:
    goto StartPC;
<END>
```

In particular, note that after finishing the work in "mfunction", each speculative thread will wait for its previous thread to be done in order to commit. For the main thread, it will wait for the last slave thread before finishing the parallel loop. This is logical when only the previous thread is done, since we can guarantee no further transaction failure.

In an example embodiment, the main thread is always non-speculative to make sure progress can be made at runtime. The checkpoint and commit instructions will be issued in the slave threads only if loops are parallelized speculatively. Otherwise, inserting checkpoint/commit instructions may unnecessarily make DOALL loops serialized if other events cause transaction failure.

As noted herein, checkpoints can be used to monitor transaction regions so that speculative computational results from a transaction region are buffered but not released to main memory (not "committed") until it is clear they are correct. A checkpoint can be located or inserted (e.g., in block 456 of FIG. 4) at the beginning of such speculatively executed code to trigger oversight and/or allow the computer (via software and/or hardware) to identify dependencies at run time (e.g., block 458 and/or 460 of FIG. 4), and a checkpoint or commit instruction can be inserted at a later junction to help determine whether the speculatively generated results are correct or should be discarded and remedial code executed. The ending checkpoint can be, for example, similar to a trap, where if conditions are correct the results are committed, but if they are not then remedial code is called or executed to resolve the problem (e.g. go back or retrace and begin execution from an appropriate, e.g. verified, point or stage in the program). Thus a checkpoint can be used as an entry marker to a transaction region, and a (or another) checkpoint or commit can be used as an exit from the transaction region, to either commit or execute remedial code. Note that reduction and copy out typically occur after data and/or instructions have committed.

Note also that in example embodiments, the transaction region that is surrounded or encompassed by the checkpoint/commit contains or comprises two things: the outlined function that is needed to do the real work (e.g., an original function of the program being parallelized, for example a function that is useful or necessary to accomplishing an objective of the program); and the spin-waiting loop with non-transactional load that waits for the previous thread to finish before its own commit. In example embodiments, the transaction region contains substantially only those two things.

In example embodiments, transaction regions surrounded or marked by one or more checkpoints are selected to contain a minimum of extra commands or instructions, or to contain only necessary instructions, to minimize a number of computations (e.g. within the transaction region) that are checked by hardware, This can be desirable to conserve use of hardware resources, and provide attendant advantages of greater speed, lower cost, lower power consumption, and so forth. In an exemplary embodiment, specific commands or instructions (e.g. within and/or without a marked transaction region) such as non-transactional loads can be exempted from monitoring, to additionally or further conserve resources.

Thus, in example embodiments checkpoint and commit instructions can be provided in the parallelization library to enable or enhance speculative automatic parallelization.

In an example embodiment, some thread synchronization can be useful to enable or implement nested parallel looping. In an example embodiment, a thread local storage variable "_spec_master_func_entered_" is used for such an implementation. More complex data structures can be used to support non-serialized nested parallel loops.

In an example embodiment, the runtime library can support strip-mining such that the whole work is first divided into several "sub-group"s. Then, the work in each "sub-group" is done by the main thread and the speculative threads as discussed herein.

With respect to transaction failure control, when a transaction fails, control will transfer to FailPC as shown above in the pseudo code for slave function "_spec_slave_thread_". In the execution path following FailPC, the thread will first wait until its previous thread is done, then it will start to do its work again (e.g., block 462 of FIG. 4). In example embodiments, one speculative thread failure does not automatically require that the subsequent speculative threads be squashed or aborted. This is similar to the relation between non-speculative main thread and other speculative threads. Thus, a mechanism for transaction failure control is provided in the parallelization library.

With respect to Reduction and Copy Out support, in example embodiments the compiler and parallelization library support scalar reductions with the following types: char; unsigned char; short; unsigned short; int; unsigned int; long long'unsigned long long; float; double; and, long double. For integral types, in an example embodiment the compiler supports the following reduction operations: plus; minus; multiplication; max; min; bitwise-and; and, bitwise-or. For floating point types, in an example embodiment the compiler supports the following reduction operations: plus; minus; multiplication; max; min.

In an example embodiment, the "mfunction" will call the "_mt_spec_reduc_" function to record the reduction operation, and the parallelization library will allocate necessary space to keep such information. The actual reduction can be done after all speculative threads are known to have committed.

In an example embodiment, there is an exception for the "main" thread identified by thread_id parameter. For the "main" thread, the library will do reduction directly instead of storing the information and doing the reduction work later. This can be used to support nested parallelism. For an inner serialized parallelization construct, the reduction operation can be done solely by the "main" thread and will not pollute or corrupt the data structure used for the outermost parallelization construct.

In an example embodiment, the compiler and parallelization library supports the following types of copy out operation: char; unsigned char; short; unsigned short; int; unsigned int; long long; unsigned long; float double; long double; pointer; and, array. Similar to the reduction case, the "mfunction" calls _mt_spec_copy_out_ to record the copy out operation. In an example embodiment, the parallelization library will allocate space to store information and do actual copy out later. If the current thread is the "main" thread, the copy-out will be done immediately.

In example embodiments, reduction and copy-out can be done in one or more of three ways or techniques, that can be performed or implemented for example in block 464 of FIG. 4.

In a first technique, reduction (e.g., merging of partial results) and copy-out are done by each thread immediately after commit, but before setting the "_spec_thread_done_" flag. This way, reduction can be done by each thread, and no lock/unlock is needed since its logically previous thrads have done reduction/copy-out and its logically subsequent threads have not received the "_spec_thread_done_" signal from this thread yet.

In a second technique, reduction and copy-out is done by the main thread in an "eager" manner. After each thread is done, it will set a special flag to indicate that it has committed. In this situation the data structure_spec_thread_done_is not used since its value may be reset by other speculative threads. Thus, the main thread will eagerly check the special flag and do the reduction and copy-out whenever possible.

In a third technique, reduction and copy-out is done by the main thread in a lazy manner. The main thread waits until all speculative threads are done, and then the main thread does the reduction and copy-out. (In an example embodiment, the main thread only waits for the last speculative thread is done, due to in-order commit requirement). This can be useful, for example, where the speculatively executed threads are sequential.

The algorithm pseudo codes described further above implement the lazy or third technique, but those skilled in the art will recognize that different implementations can be used, for example the first (immediate) or second (eager) techniques described above.

Thus, in example embodiments mechanisms are provided to conduct reduction and copy-out operations for the purpose of speculative automatic parallelization.

Value Predictable Scoping

When a variable (e.g. a scalar variable) is defined and used inside a loop and is not a reduction, in an example embodiment this variable is scoped as "shared" by default since there is an inter-loop-iteration dependence which can advantageously be preserved, even across different threads. One example is the variable "j" in Example 1 described herein, Such scoping, however, can cause transaction failure, because all speculative and non-speculative threads may write to the same memory location. In accordance with example embodiments, value predictable scoping can be used to alleviate this problem.

By way of further background before discussing how value predictable scoping is performed in example embodiments, consider that if the value of a scalar variable can be predicted along one or more paths in a computer program, it can be possible to scope this variable as copy-in private. If at runtime those paths which cause value prediction failure are visited, then the transaction should fail.

In an example embodiment, to support value predictable scoping, each thread (e.g., each speculative thread) is associated with one synchronization variable. For example, we can represent this synchronization variable as_value_predict_sync_var_[thread _id]. An initial value of _value_predict_sync_var_[thread_id] will be 0. If value prediction is wrong or produces an incorrect result for any particular thread, in example embodiments the variable _value_predict_sync_var_[thread_id] is set to 1 for that thread, which means that any speculative threads logically subsequent to or dependent upon that thread should be squashed or discarded.

Now, we turn to a discussion of how to implement value predictable scoping in accordance with example embodiments. For a given loop in a program being parallelized, suppose one variable "s" (which in an example embodiment is a scalar variable) is defined and used inside the loop. The variable "s" is scoped as "value predictable" if the following conditions are met: 1) "s" is only defined once in the loop; 2) "s" is not defined inside any inner loop (e.g. any loop within the given loop); and 3) assuming that the assignment for "s" is always executed inside the loop, the compiler is able to determine the value of "s" for any loop iteration based on one or more copy-in variables and a loop index value.

When value prediction is wrong or produces incorrect value(s) along certain paths, in an example embodiment the compiler inserts codes and/or executable instructions to cause transaction failing along these paths, or in other words inserts codes or instructions that will cause or enable those paths to be recognized as incorrect or failed and treated accordingly, e.g. quashed. In example embodiments, the compiler identifies such paths by applying a simple algorithm such as this one:

1: Suppose or presume that the basic block which contains the "s" assignment is "bp".

2: Traverse the control flow graph backwards starting with "bp", by visiting each of "bp"'s predecessors, e.g. recursively. Identify all blocks along the path until the path reaches the loop header block. The result is a set of the identified blocks, which we call "success_path_bp_set".

3: For every block "bp1" in "success_path_bp_set", if any of its successors, say "bp2", is not in "success_path_bp_set", the path from "bp1" to "bp 2" would be considered as a failure path. If the "bp2"'s sole predecessor is "bp1", then add "bp2" to "failure_path_bp _set". Otherwise, create a new block, "bp3", and redirect the path as "bp1"->"bp3"->"bp2", and add "bp3" to "failure_path_bp_set". This way, we avoid adding failure path(s) for other predecessors of "bp2".

The result of the above is the "failure_path_bp_set". The compiler will add "<store 1 to _value_predict_sync_var_[thread_id]>" to the beginning of every block in "failure_path_bp_set", where thread_id is corresponding to the current thread id.

In example embodiments, a value-predictable variable will have correct values when not on a failure path, e.g. when identified failure pats with respect to the variable are not executed.

Once the compiler identifies one or more variables that can each be scoped as a value predictable variable, it needs to generate correct codes to reflect such a scoping. For our above example, the following shows example pseudocode for the generated "mfunction" code:

```
mfunction (argv, thread_id, lower, upper, last_orginal_index_value,
    parallel_starting_lower, addr_of_value_predict_sync_var) {
  <get addr_of_original_j, addr_of_original_p from argv>
  <get copy_in_a, copy_in_b from argv>
  copy_in_j = *addr_of_original_j;
  // Initialize local reduction variable.
  reduction_s = 0.0;
  // Initialize the value prediction variable
  value_predict_j = copy_in_j + (lower − parallel_starting_lower);
  for (k = lower; k <= upper; k++) {
    private_p = foo (k);
    if (copy_in_a[k]) {
      // Come to the path which makes transaction fail.
      // This store will make this thread, if speculative, and
      // its subsequent speculative thread fail.
      <Store 1 to addr_of_value_predict_sync_var>
      continue;
    }
    reduction_s = reduction_s + copy_in_b[value_predict_j];
    value_predict_j = value_predict_j + 1;
  }
  _mt_spec_reduction_ (addr_of_original_s, reduction_s,
      reduction_opcode, thread_id);
  if (k == last_original_index_value) {
    _mt_spec_copy_out_ (private_p,
      addr_of_original_p, thread_id);
  }
  if ((*addr_of_value_predict_sync_var) == 1) {
    _mt_spec_vp_copy_out_ (value_predict_j,
      addr_of_original_j, thread_id);
  }
}
```

We will now explain further regarding the above example, specifically the code related to or involved with value predictable scoping.

Two extra parameters are passed to the outlined function from the parallelization library. The "parallel_starting_lower" represents the loop lower bound starting from which a number of loop iterations are distributed and executed in parallel by multiple threads. If the work is expected to be executed by just one single thread, the "parallel_starting_lower" is the same as loop "lower". Intuitively, the "parallel_starting_lower" also indicates the loop iteration number for which the copy_in_j gets its value.

The "addr_of_value_predict_sync_var" variable represents the address of the _value_predict_sync_var _for that particular thread. The initial value for this thread for the value predictable variable "j" is computed as value_predict_j=copy_in_j+(lower-parallel _starting_lower). In general, the formula is more complicated and depending on how the value predictable variable is updated in the original loop.

In each of the failure path blocks, e.g., the "continue" statement block in the above mfunction pseudocode, one statement "Store 1 to addr_of_value_predict_sync _var" is inserted by the compiler. In example embodiments, the_value_predict_sync_var_variable will be checked later by the parallelization library.

Last, if value prediction is wrong for this thread or produces an incorrect result, the last or most recent correct value of the predictable variable (e.g. "value_predict_j" above) is copied out to the shared location (e.g. "addr_of_original_j" above) and later on it can be read in again by the subsequent speculative threads. Note that the current speculative thread does not necessarily have to fail. To avoid unnecessary failure of the current speculative thread, similar to regular copy-out, value predictable copy-out will first copyout to some temporary location, and the real copy-out happens after the commit. For the main thread, the copy-out immediately happens inside function _mt_spec_vp_copy_out_.

Below is a description in accordance with example embodiments of how the parallelization library can be enhanced to support value predictable scoping.

The following shows an example pseudo code structure for_spec_MasterFunction_, with sections bolded or framed with asterisks to indicate particular differences from the _spec_MasterFunction_previously described.

```
_spec_MasterFunction_ (argv, <other information>)
<BEGIN>
  if (_spec_master_func_entered_ > 0) {
    num_threads = 1; /* serialize the inner regions if nested parallelism */
  }
  else {
    num_threads = _spec_num_threads_;
  }
  _spec_master_func_entered_ ++;
  if (num_threads > 1) {
    <store "argv", "mfunction", and some information to compute
      lower/upper/last_value to some shared space>
    /* Notify slave threads to start the work */
    for (int i = 1; i < num_threads; i++) _spec_thread_start_[i]    = 1;
  }
  <compute lower, upper, last_value>
  if (num_threads > 1) {
    "mfunction" (argv, 0, lower, upper, last_value, **lower,
      &_value_predict_sync_var_[0]**);
      /* Main thread finished its work */
    _spec_thread_done_[0] = 1;
    /* Wait for speculative threads to be done */
    while (_spec_thread_done_[num_threads − 1] == 0);
    /* Reset _spec_thread_done_ and _value_predict_sync_var_ */
    _spec_thread_done_[num_threads − 1] = 0;
    _value_predict_sync_var_[num_threads − 1] = 0;
    /* Okay, done the work, do reduction and copy out here if needed. */
    _main_thread_final_reduc_ ( );
  }
  else {
    /* For nested parallelism or only one thread,
    * **using one local_sync_var on the stack. This way,
    * nested running mfunction will not affect other mfunctions
      with sync var.**
    */
    "mfunction" (argv, 0, lower, upper, last_value, **lower,
      &local_sync_var**);
  }
  _spec_master_func_entered_ --;
<END>
```

Note that in this version of "mfunction", the last two parameters correspond to the parallel starting lower bound and the address of the synchronization variable for the main thread.

The following shows an example pseudo code structure for_spec_slave_thread_, with sections bolded or framed with asterisks to indicate differences from the_spec_slave_thread_ previously described.

```
_spec_slave_thread_(int thread_id)
<BEGIN>
  StartPC:
  /* Wait for the signal to start */
  while (!_spec_thread_start_[thread_id]);
  /* Set this before checkpointing */
  _spec_thread_start_[thread_id] = 0;
  <compute lower, upper, last_value>
  if (<loop is parallelized speculatively>) {
    _checkpoint_ (FailPC);
  }
  "mfunction" (argv, thread_id, lower, upper, last_value,
        original_parallel_lower,
        &_value_predict_sync_var_[thread_id]);
  /* wait for previous thread done and then commit */
  /* The load here should not cause transaction fail, i.e., it should be a
  * non-transactional load.
  */
  while (_spec_thread_done_[thread_id − 1] == 0);
  **if (_value_predict_sync_var_[thread_id − 1] == 1) {
    <fail the transaction for this thread>
  }**
  if (<loop is parallelized speculatively>) {
    _commit_ ( );
  }
  **<do copy-out for value predictable variables if the value has been
  copied into a temporary space in _mt_spec_vp_copy_out_>**
  _spec_thread_done_[thread_id − 1] = 0;
  _spec_thread_done_[thread_id] = 1;
  goto SuccessPC;
  FailPC:
  /* Wait for previous thread done */
  while (_spec_thread_done_[thread_id − 1] == 0);
  **if (_value_predict_sync_var_[thread_id − 1] == 1) {
    /* Notify the subsequent speculative thread to fail. */
    _value_predict_sync_var_[thread_id] = 1;
  }**
  "mfunction" (argv, thread_id, lower, upper, last_value, lower,
    &_value_predict_sync_var_[thread_id]);
    **< do copy-out for value predictable variables if the value has
  been copied into a temporary space in _mt_spec_vp_copy_out_>**
  _spec_thread_done_[thread_id − 1] = 0;
  _value_predict_sync_var_[thread_id − 1]    = 0;
  _spec_thread_done_[thread_id]    = 1;
  SuccessPC:
  goto StartPC;
<END>
```

The "original_parallel_lower" in the above pseudo-code represents the loop lower bound that the parallelization library starts with to try and distribute workload to several threads for parallel execution.

In accordance with example embodiments, where a speculative thread is previous to a current speculative thread (e.g., the current thread depends on the previous thread), after the previous speculative thread is done, the current speculative thread checks whether the previous speculative thread had a value prediction failure(s). If the previous speculative thread did incur a wrong value prediction, the current thread will make or invoke its own transaction failure so that the current thread will also fail or be aborted. If on the other hand the previous speculative thread completed or committed successfully, the library (or for example code from the library that is inserted or linked into the target program by the compiler, and then executed at runtime of the parallelized program) will discern or determine whether any copy-out is needed (or not) for value predictable variables before setting its own_spec_thread_done_variable.

In the FailPC path of the_spec_slave_thread_pseudo-code above, after waiting for the previous thread to be done, the current speculative thread will check whether the previous thread had or incurred an incorrect value prediction (e.g., failed) or not. If yes, then the current speculative thread will set its own_value_predict_sync_var _, which will squash or abort all the subsequent speculative threads recursively.

In example embodiments, the copy_out which happens immediately after the "commit" or in the FailPC path is the copy out that updates the original memory location for the value predictable variables. After this, the updated value will be visible to later on copy-in's.

Thus, in example embodiments, support for nested parallelism is improved and enhanced, via frameworks that parallelize loops with function calls inside, thus enabling nested parallelism. In example embodiments described herein, all inner nested parallelism is serialized. More complex data structures can be used to support truly non-serialized inner parallel loops.

Figure 5:
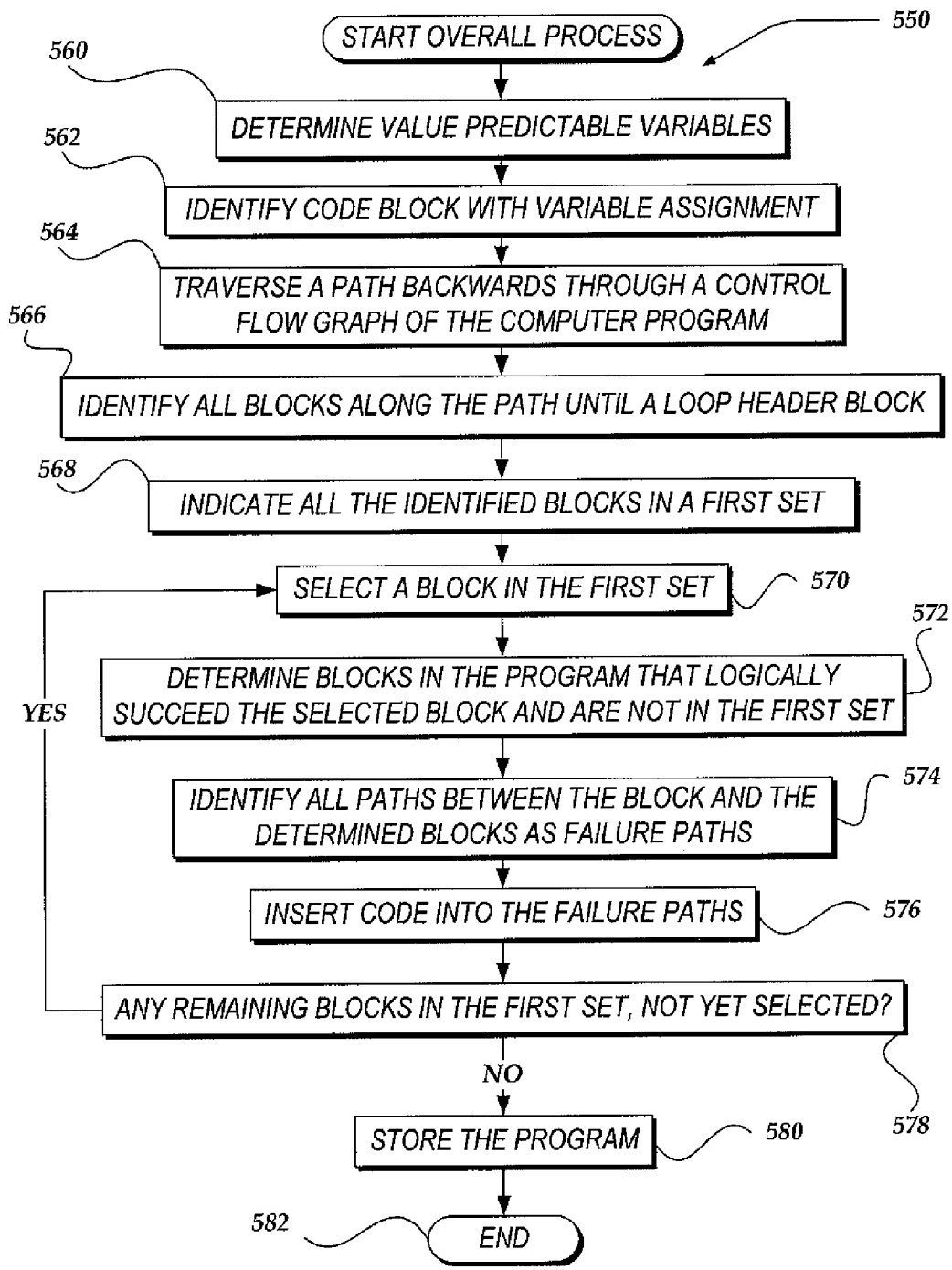
FIG. 5 illustrates an example process in accordance with example embodiments.

FIG. 5 illustrates an example process 550 for applying scoping rules outlined above, and which can be executed or performed by the compiler and/or at the compiling stage of the program being parallelized. In a first block 560, value predictable variables are determined or identified, for example as described herein. From block 560, control proceeds to block 562, where a code block containing an assignment of a variable (e.g., a value predictable variable) is identified. From block 562 control proceeds to block 564, where a path is traversed backwards through a control flow graph of the computer program, starting with the block identified in block 562. The flow graph can be provided to the compiler, or can be generated by the compiler using known techniques. From block 564 control proceeds to block 566, where all blocks along the path until a loop header block is reached, are identified, and then in block 568 indicated or named in a first set. Thus the set lists or names all the identified blocks. From block 568 control proceeds to block 570, where a block is selected from the set (sequentially, at random, or otherwise). Control proceeds from block 570 to block 572, where blocks in the program that logically succeed or follow the selected block, and are not in the first set, are determined or identified. This can be done, for example, by traversing the control flow graph forwards from the selected block. From block 572 control proceeds to block 574, where all paths between the selected block and the blocks determined in block 572 are identified as failure paths, and from block 574 control proceeds to block 576 where code is inserted into the failure paths identified in block 574, for example code that when executed at run time of the program (e.g. if those paths are followed or executed when the program is run) will fail or identify the path it is in, as a failure path so that appropriate action can be taken at run time to recover from or compensate for the failure. The code can, for example, be inserted into the determined blocks or between the selected block and the determined blocks. From block 576 control proceeds to block 578, where a determination is made, whether there are any remaining blocks in the first set that have not yet been selected. If yes, then control returns to block 570. Thus, the actions in blocks 527-576 can be performed for each block in the first set. If the determination in block 578 is no, then control proceeds from block 578 to block 580, where the updated or revised program is stored, for example in a computer memory or machine-readable medium such as a flash drive, compact disc, magnetic tape, and so forth. From block 580, control proceeds to block 582 where the process ends. The process of FIG. 5 can be repeated for each code block with an assignment of a variable.

Figure 6:
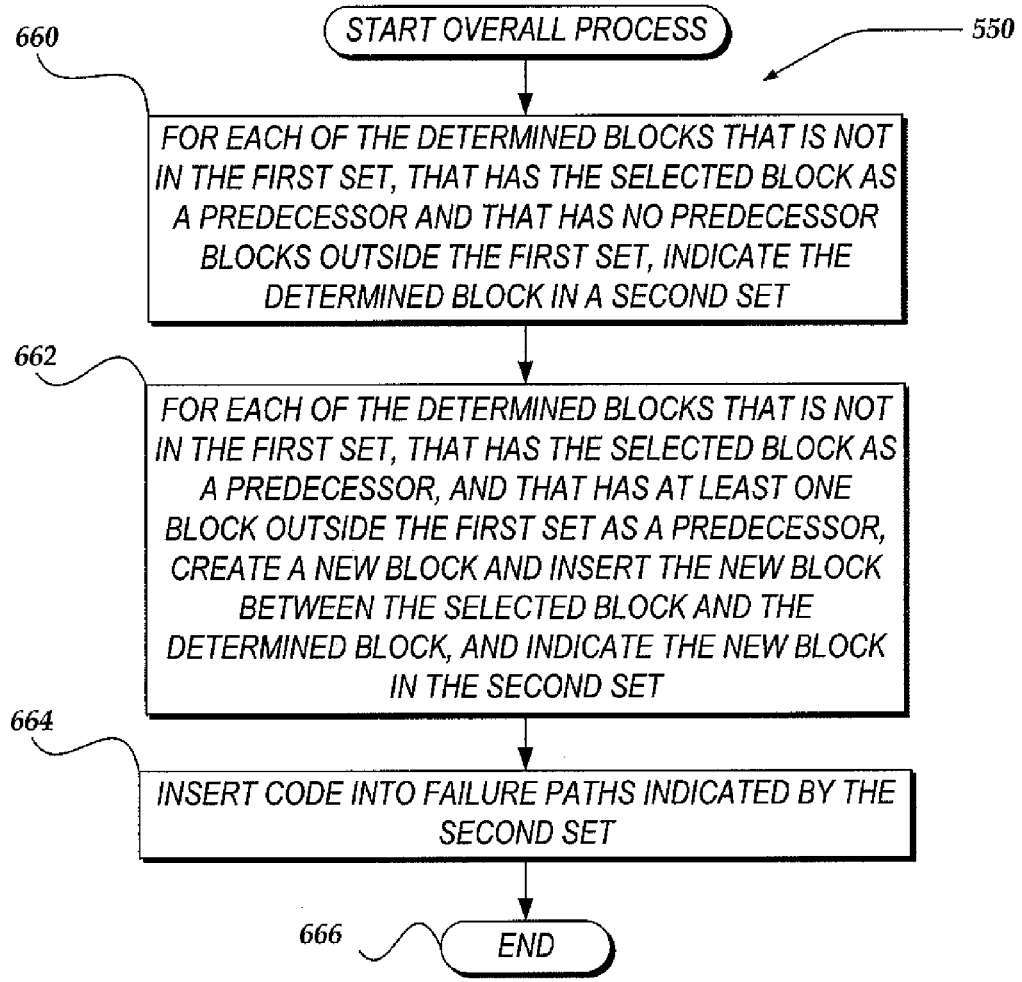
FIG. 6 illustrates an example process that can be substituted for part of the process shown in FIG. 5.

FIG. 6 illustrates a process that can be substituted for blocks 572-576. In block 660, for each of the blocks determined in block 572, that has the selected block as a predecessor, and that has no blocks outside the first set as predecessors, indicate the determined block in a second set. From block 660 control proceeds to block 662, where for each of the blocks determined in block 572 that has the selected block as predecessor and that has at least one block outside the first set as a predecessor, a new block is created and inserted between the determined block and the selected block, and the new block is indicated or added to the second set. From block 662, control proceeds to block 664, where code is inserted into the failure paths indicated by or identified in the second set. For example, the code can be code that when executed at run time of the program (e.g. if those paths are followed or executed when the program is run) will fail or identify the path it is in, as a failure path so that appropriate action can be taken at run time to recover from or compensate for the failure. The code can, for example, be added into the new block, or into the determined block.

It will be understood that the methods described herein and each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention. The computer program instructions can be stored in computer readable media, for example memory chips, optical media such as CD ROM or DVD ROM disks, magnetic media such as floppy disks or magnetic tape, RAM (random access memory), and other storage media. In addition, example embodiments of the invention can be implemented in hardware, firmware, software, or combinations thereof.

Accordingly, methods and/or blocks of the flowchart illustration described or shown herein support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The examples provided should not be construed as narrowing the embodiments of the invention, and are intended merely to provide a better understanding. Thus, other mechanisms may therefore be employed, without departing from the scope of the invention.

The above specification, examples, and data provide a complete description of the manufacture and use of the composition of the invention. Since many embodiments of the invention may be made without departing from the spirit and scope of the invention, the invention resides in the claims hereinafter appended.

What is claimed as new and desired to be protected by Letters Patent of the United States is:

1. A method for parallelizing execution of a computer program, comprising:
   identifying a first code block that contains an assignment of a variable;
   traversing, by a computer processor, a path backwards through a control flow graph of the computer program, starting with the identified code block, wherein the path comprises a plurality of blocks;
   identifying, by the computer processor, all blocks along the path until the path reaches a loop header block;

indicating all the identified blocks in a first set;

for each block in the first set, a) determining blocks in the program that logically succeed the block and are not in the first set, and b) identifying all paths between the block and the determined blocks as failure paths;

inserting, by the computer processor, code into the failure paths, wherein the inserted code comprises instructions for causing a computer to identify the corresponding path as failed at run time of the program; and storing the program including the inserted code.

2. The method of claim 1, wherein the traversing comprises recursively visiting each code block that logically precedes the first code block.

3. The method of claim 1, comprising:

for each loop in the program, determining all variables that are defined only once in the loop, are not defined in any inner loop of the loop, and are used in the loop; and identifying the determined variables as value predictable variables.

4. The method of claim 1, comprising:

for each of the determined blocks that is not in the first set, that has at least one predecessor block in the first set and that has no predecessor blocks outside the first set, indicating the determined block in a second set;

for each of the determined blocks that is not in the first set, that has at least one predecessor block outside the first set and that has at least one predecessor block in the first set, creating for each of the at least one predecessor block in the first set a new block, inserting the new block between the corresponding predecessor block and the determined block, and indicating the new block in the second set; and inserting code into failure paths indicated by the second set, wherein the inserted code comprises instructions for causing a computer to identify the corresponding path as failed at run time of the program.

5. The method of claim 1, wherein the variable is a scalar variable.

6. The method of claim 1, comprising:

at run time if a value of a value predictable variable in a speculative thread is wrong, then copying out a last known correct value of the value predictable variable to a shared location; and at run time in the speculative thread, copying out the value predictable variable to a temporary location prior to commit.

7. The method of claim 6, comprising:

at run time if a value of the value predictable variable in the speculative thread is wrong, then quashing all subsequent speculative threads of the program.

8. An apparatus for parallelizing execution of a computer program comprising a processor, wherein the apparatus is configured to:

receive a computer program;

identify a first code block of the program that contains an assignment of a variable;

traverse a path backwards through a control flow graph of the computer program, starting with the identified code block, wherein the path comprises a plurality of blocks;

identify all blocks along the path until the path reaches a loop header block;

indicate all the identified blocks in a first set;

for each block in the first set, a) determine blocks in the program that logically succeed the block and are not in the first set, and b) identify all paths between the block and the determined blocks as failure paths;

insert code into the failure paths, wherein the inserted code comprises instructions for causing a computer to identify the corresponding path as failed at run time of the program; and store the program including the inserted code.

9. The apparatus of claim 8, wherein the apparatus is configured to traverse the path backwards by recursively visiting each code block that logically precedes the first code block.

10. The apparatus of claim 8, wherein the apparatus is configured to:

for each loop in the program, determine all variables that are defined only once in the loop, are not defined in any inner loop of the loop, and are used in the loop; and identify the determined variables as value predictable variables.

11. The apparatus of claim 8, wherein the apparatus is configured to:

for each of the determined blocks that is not in the first set, that has at least one predecessor block in the first set and that has no predecessor blocks outside the first set, indicate the determined block in a second set;

for each of the determined blocks that is not in the first set, that has at least one predecessor block outside the first set and that has at least one predecessor block in the first set, create for each of the at least one predecessor block in the first set a new block, insert the new block between the corresponding predecessor block and the determined block, and indicate the new block in the second set; and insert code into failure paths indicated by the second set, wherein the inserted code comprises instructions for causing a computer to identify the corresponding path as failed at run time of the program.

12. The apparatus of claim 8, wherein the variable is a scalar variable.

13. The apparatus of claim 8, wherein the apparatus is configured to associate code with the program wherein the associated code comprises instructions for causing a computer at runtime of the program to determine that a value of a value predictable variable in a speculative thread is wrong and in response to the determination copy out a last known correct value of the value predictable variable to a shared location.

14. The apparatus of claim 13, wherein the apparatus is configured to associate code with the program wherein the associated code comprises instructions for causing a computer at runtime of the program to determine that a value of a value predictable variable in a speculative thread is wrong and in response to the determination quash all subsequent speculative threads of the program.

15. The apparatus of claim 8, wherein the apparatus is configured to associate code with the program wherein the associated code comprises instructions for causing a computer at runtime in a speculative thread of the program to copy out a value predictable variable to a temporary location prior to commit.

16. A non-transitory computer readable storage medium for parallelizing execution of a computer program comprising instructions for causing a computer to perform:

identifying in a computer program a code block that contains an assignment of a variable;

traversing a path backwards through a control flow graph of the computer program, starting with the identified code block, wherein the path comprises a plurality of blocks;

identifying all blocks along the path until the path reaches a loop header block;

indicating all the identified blocks in a first set;

for each block in the first set, a) determining blocks in the program that logically succeed the block and are not in the first set, and b) identifying all paths between the block and the determined blocks as failure paths;

inserting code into the failure paths, wherein the inserted code comprises instructions for causing a computer to identify the corresponding path as failed at run time of the program; and storing the program including the inserted code.

17. The medium of claim 16, wherein the traversing comprises recursively visiting each code block that logically precedes the first code block.

18. The medium of claim 16, wherein the medium comprises instructions for causing the computer to perform:

for each loop in the program, determining all variables that are defined only once in the loop, are not defined in any inner loop of the loop, and are used in the loop; and identifying the determined variables as value predictable variables.

19. The medium of claim 16, wherein the medium comprises instructions for causing the computer to perform:

for each of the determined blocks that is not in the first set, that has at least one predecessor block in the first set and that has no predecessor blocks outside the first set, indicating the determined block in a second set;

for each of the determined blocks that is not in the first set, that has at least one predecessor block outside the first set and that has at least one predecessor block in the first set, creating for each of the at least one predecessor block in the first set a new block, inserting the new block between the corresponding predecessor block and the determined block, and indicating the new block in the second set; and inserting code into failure paths indicated by the second set, wherein the inserted code comprises instructions for causing a computer to identify the corresponding path as failed at run time of the program.

20. The medium of claim 16, wherein the variable is a scalar variable.

21. The medium of claim 16, wherein the medium comprises instructions for causing the computer to perform:

at run time of the program in a speculative thread of the program, copying out a last known correct value of a value predictable variable to a shared location when a value of the value predictable variable in the speculative thread is wrong;

at run time in a speculative thread of the program, copying out a value predictable variable to a temporary location prior to commit.

22. The medium of claim 16, wherein the medium comprises instructions for causing the computer to perform:

determining at run time that a value of a value predictable variable in a speculative thread is wrong; and quashing all subsequent speculative threads of the program.

\* \* \* \* \*